US008938805B1

(12) United States Patent
Juels et al.

(10) Patent No.: US 8,938,805 B1
(45) Date of Patent: Jan. 20, 2015

(54) DETECTION OF TAMPERING WITH SOFTWARE INSTALLED ON A PROCESSING DEVICE (71) Applicant: EMC Corporation, Hopkinton, MA (US)

(72) Inventors: Ari Juels, Brookline, MA (US); Catherine V. Hart, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 121 days.

(21) Appl. No.: 13/625,497

(22) Filed: Sep. 24, 2012

(51) Int. Cl.
G06F 11/00 (2006.01)

(52) U.S. Cl.
USPC ............ 726/23; 726/21; 726/24; 380/44; 380/247; 380/248; 380/278; 713/155

(58) Field of Classification Search
USPC .......... 726/23, 24, 21; 380/44, 247, 248, 278; 713/155
See application file for complete search history.

(56) References Cited

U.S. PATENT DOCUMENTS

| 4,293,910 | A | * | 10/1981 | Flusche et al. | 711/157 |
|---|---|---|---|---|---|
| 7,216,345 | B1 | * | 5/2007 | Porter | 718/100 |
| 7,461,140 | B2 | * | 12/2008 | Spry et al. | 709/220 |
| 7,519,996 | B2 | * | 4/2009 | Cain | 726/23 |
| 7,523,281 | B2 | * | 4/2009 | Madathilparambil George et al. | 711/163 |
| 7,549,164 | B2 | * | 6/2009 | Cook et al. | 726/22 |
| 7,571,474 | B2 | * | 8/2009 | Ross et al. | 726/22 |
| 7,636,944 | B2 | * | 12/2009 | Raikar | 726/22 |
| 7,774,844 | B1 | * | 8/2010 | Chehadeh et al. | 726/23 |
| 8,370,936 | B2 | * | 2/2013 | Zuk et al. | 726/23 |
| 8,745,730 | B1 | * | 6/2014 | Worsley | 726/21 |
| 2004/0010545 | A1 | * | 1/2004 | Pandya | 709/203 |
| 2005/0132212 | A1 | * | 6/2005 | Haswell | 713/193 |
| 2005/0251860 | A1 | * | 11/2005 | Saurabh et al. | 726/23 |
| 2006/0069912 | A1 | * | 3/2006 | Zheng et al. | 713/151 |
| 2006/0294589 | A1 | * | 12/2006 | Achanta et al. | 726/24 |
| 2007/0255943 | A1 | * | 11/2007 | Kern et al. | 713/155 |

(Continued)

OTHER PUBLICATIONS

U.S. Appl. No. 13/537,981, filed in the name of A. Juels et al. on Jun. 29, 2012 and entitled "Methods and Apparatus for Secure, Stealthy and Reliable Transmission of Alert Messages from a Security Alerting System."

(Continued)

Primary Examiner — Joseph P Hirl
Assistant Examiner — Sayed Beheshti Shirazi
(74) Attorney, Agent, or Firm — Ryan, Mason & Lewis, LLP (57) ABSTRACT A processing device comprises a processor coupled to a memory and implements a host-based intrusion detection system configured to permit detection of tampering with at least one software component installed on the processing device. The host-based intrusion detection system comprises a forward-secure logging module configured to record information characterizing a plurality of events occurring in the device in such a manner that modification of the recorded information characterizing the events is indicative of a tampering attack and can be detected by an authority. For example, the recorded information may comprise at least one forward-secure logging record R having entries $r_1 \ldots r_n$ corresponding to respective ones of the events wherein any erasure or other modification of a particular pre-existing entry $r_i$ in R by an attacker is detectable by the authority upon inspection of R.

18 Claims, 4 Drawing Sheets (56) References Cited

U.S. PATENT DOCUMENTS

| | | | |
|---|---|---|---|
| 2008/0037791 A1* | 2/2008 | Jakobsson | 380/278 |
| 2009/0064333 A1* | 3/2009 | Saurabh et al. | 726/23 |
| 2009/0164522 A1* | 6/2009 | Fahey | 707/104.1 |
| 2009/0235091 A1* | 9/2009 | Kurn et al. | 713/193 |
| 2009/0249184 A1* | 10/2009 | Dieberger et al. | 715/227 |
| 2010/0070776 A1* | 3/2010 | Raman et al. | 713/189 |
| 2010/0122343 A1* | 5/2010 | Ghosh et al. | 726/23 |
| 2011/0145711 A1* | 6/2011 | Njemanze et al. | 715/736 |
| 2011/0179488 A1* | 7/2011 | Mankins | 726/23 |
| 2012/0036571 A1* | 2/2012 | Yoo | 726/13 |
| 2012/0054734 A1* | 3/2012 | Andrews et al. | 717/171 |
| 2012/0089710 A1* | 4/2012 | Rakowski et al. | 709/220 |
| 2012/0151582 A1* | 6/2012 | Reasor et al. | 726/23 |
| 2012/0260306 A1* | 10/2012 | Njemanze et al. | 726/1 |
| 2013/0067560 A1* | 3/2013 | Zuk et al. | 726/13 |

OTHER PUBLICATIONS

U.S. Appl. No. 13/249,957, filed in the name of A. Juels et al. on Sep. 30, 2011 and entitled "Methods and Apparatus for Secure and Reliable Transmission of Messages Over a Silent Alarm Channel."

U.S. Appl. No. 13/334,709, filed in the name of A. Juels et al. on Dec. 23, 2011 and entitled "Methods and Apparatus for Generating Forward Secure Pseudorandom Numbers."

U.S. Appl. No. 13/404,788, filed in the name of A. Juels et al. on Feb. 24, 2012 and entitled "Methods and Apparatus for Silent Alarm Channels Using One-Time Passcode Authentication Tokens."

U.S. Appl. No. 12/982,288, filed in the name of J.P. Field et al. on Dec. 30, 2010 and entitled "Distributed Security Information and Event Management System with Application-Injected Remote Components."

\* cited by examiner

DETECTION OF TAMPERING WITH SOFTWARE INSTALLED ON A PROCESSING DEVICE

FIELD

The field relates generally to processing devices, and more particularly to techniques for detection of software attacks on a processing device.

BACKGROUND

Mobile phones, computers and other types of processing devices are typically sold with a variety of pre-installed software components that are sanctioned by the manufacturer or an associated service provider and are clearly not intended to be tampered with by a user. However, in many instances, hackers may attempt to modify, bypass, remove, replace or otherwise tamper with such pre-installed software components. For example, in the case of mobile phones, the term "jailbreaking" is generally used to refer to bypassing of sanctioned device software and its associated control mechanisms.

Various jailbreak exploits by hackers have already been documented for many if not all versions of the Apple iPhone and iPad, as well as numerous other types of processing devices, thereby enabling users to bypass manufacture and service provider control mechanisms on these devices. This can allow the devices to be used in ways that were not envisioned by the manufacturer or service provider, possibly to the serious detriment of these entities and their legitimate users.

Unfortunately, prevention of jailbreaks is challenging under conventional practice. The jailbreaks can be implemented as general-purpose attacks that may exploit any of a wide range of operating system or driver level vulnerabilities. Comprehensive jailbreak protection is essentially as hard to provide as comprehensive protection of low-level software services within a given processing device.

Similarly, detection of jailbreaking is difficult under conventional practice because a processing device, while undergoing a jailbreak, is typically not connected to a network. For example, in current-generation Apple devices, a hacker places a device into a maintenance mode while jailbreaking it. This mode of operation reduces the device to a minimal set of software services, exposing them directly to attack, and places the device off-network, preventing externally prompted interruption of the jailbreak. Also, once jailbroken, the device may be instrumented with modified software configured to suppress any evidence of attack. Accordingly, under conditions such as these, detection of a jailbreak is seemingly impossible, in that the device cannot communicate while under attack, and after the attack it contains software that suppresses evidence of jailbreaking.

SUMMARY

Illustrative embodiments of the present invention provide processing devices that can securely record evidence of jailbreaking or other types of tampering with software installed on those devices, in a manner that allows subsequent detection by a manufacturer, service provider or other authority.

In one embodiment, a processing device comprises a processor coupled to a memory and implements a host-based intrusion detection system configured to permit detection of tampering with at least one software component installed on the processing device. The host-based intrusion detection system comprises a forward-secure logging module configured to record information characterizing a plurality of events occurring in the device in such a manner that modification of the recorded information characterizing the events is indicative of a tampering attack and can be detected by an authority.

By way of example, the recorded information may comprise at least one forward-secure logging record R having entries $r_1 \ldots r_n$ corresponding to respective ones of the events wherein any erasure or other modification of a particular pre-existing entry $r_i$ in R by an attacker is detectable by the authority upon inspection of R.

The forward-secure logging module may be configured to record the information without requiring any connection between the processing device and a network, and even under conditions in which an entity carrying out the tampering attack has physical possession of the processing device.

The processing device may be configured to communicate with one or more servers of the authority. Such servers may include, for example, intrusion-alerting servers, servers associated with a security information and event management (SIEM) system, or other types of servers. A given one of the authority servers may generate an alert based on detection of the tampering attack. As one example, the recorded information may comprise an indication of placement of the processing device into a maintenance mode at a time when the processing device would not normally be placed into the maintenance mode absent a tampering attack, and the server may generate an alert in response to such information.

The illustrative embodiments advantageously overcome one or more of the above-noted drawbacks of conventional practice. For example, one or more of these embodiments may be configured such that reliable detection of a jailbreak is made possible even under conditions in which the device cannot communicate over a network while under attack, and after the attack contains software that suppresses evidence of jailbreaking. This improved ability to detect jailbreaking or other types of tampering with software installed on mobile phones or other processing devices can also have a deterrent effect that serves to help prevent such tampering.

These and other features and advantages of the present invention will become more readily apparent from the accompanying drawings and the following detailed description.

DETAILED DESCRIPTION

Illustrative embodiments of the present invention will be described herein with reference to exemplary information processing systems and associated mobile phones, computers and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as network-based communication systems such as cellular and other wireless communication systems.

One or more embodiments of the present invention can be configured to utilize techniques disclosed in at least one of U.S. patent application Ser. No. 13/537,981, filed Jun. 29, 2012 and entitled "Methods and Apparatus for Secure, Stealthy and Reliable Transmission of Alert Messages from a Security Alerting System," U.S. patent application Ser. No. 13/249,957, filed Sep. 30, 2011 and entitled "Methods and Apparatus for Secure and Reliable Transmission of Messages Over a Silent Alarm Channel," U.S. patent application Ser. No. 13/334,709, filed Dec. 23, 2011 and entitled "Methods and Apparatus for Generating Forward Secure Pseudorandom Numbers," and U.S. patent application Ser. No. 13/404,788, filed Feb. 24, 2012 and entitled "Methods and Apparatus for Silent Alarm Channels Using One-Time Passcode Authentication Tokens," all of which are commonly assigned herewith and incorporated by reference herein.

Figure 1:
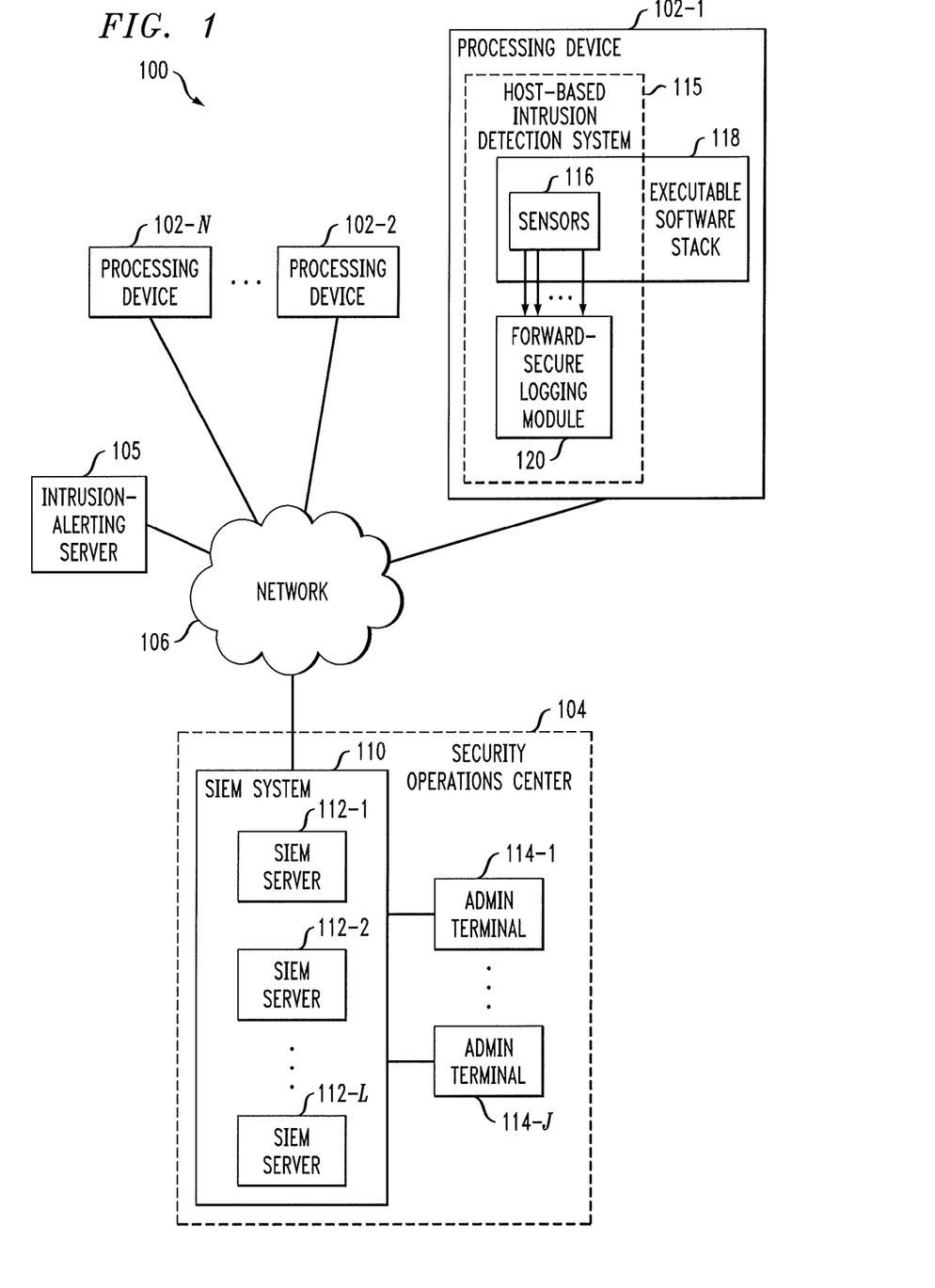
FIG. 1 shows an information processing system having a processing device configured to support software tampering detection functionality in an illustrative embodiment of the invention.

FIG. 1 shows an information processing system 100 configured in accordance with an illustrative embodiment of the invention. The system 100 in this embodiment comprises a plurality of processing devices 102-1, 102-2, . . . 102-N that are configured to communicate with a security operations center (SOC) 104 and an intrusion-alerting server 105 over a network 106. The SOC 104 and intrusion-alerting server 105 may be associated with a common authority or respective multiple authorities. Also, although both SOC 104 and intrusion-alerting server 105 are included in this embodiments, other embodiments may include only SOC 104 or intrusion-alerting server 105, or other arrangements of one or more servers associated with at least one authority. The term "authority" as used herein is intended to be broadly construed, and in the context of the present embodiment refers to an entity of system 100 that is able to detect a tampering attack involving one or more of the processing devices 102 based on information recorded by that device in a forward-secure manner.

The processing device 102-1 may be implemented in the form of a mobile phone, computer or other communication device that is typically associated with a particular system user, although it is also possible that multiple processing devices 102 may be associated with the same user, or multiple users may be associated with the same processing device 102. A given such processing device 102 generally comprises at least one processor and an associated memory, and implements one or more functional modules for controlling certain features of the system 100. System servers such as intrusion-alerting server 105 may be configured in a similar manner to include processor and memory elements and one or more associated functional modules. Servers are therefore also considered a type of "processing device" as that term is broadly utilized herein.

The processor in a given processing device of system 100 may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. The memory and other memories disclosed herein may be viewed as examples of what are more generally referred to as "computer program products" storing executable computer program code.

In addition to a processor and a memory, a processing device will generally include a variety of other types of circuitry, such as network interface circuitry that allows the processing device to communicate with other processing devices over one or more networks such as network 106. Such networks may include, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The network interface circuitry may comprise one or more conventional transceivers.

System elements such as elements 102, 104, 105 and 106 may be implemented using one or more processing platforms each comprising multiple processing devices. Examples of processing platforms that may form portions of the system 100 will be described in more detail below in conjunction with FIGS. 3 and 4. Such processing platforms may comprise cloud infrastructure of a cloud service provider.

The SOC 104 in the present embodiment comprises a SIEM system 110 that includes a plurality of SIEM servers 112-1, 112-2, . . . 112-L. The SOC 104 also includes a plurality of administrator terminals 114-1, 114-2, . . . 114-J that serve as interfaces between the SIEM system 110 and administrative personnel. Portions of the SIEM system 110 may correspond to elements of an otherwise conventional SIEM system, such as the EnVision® platform commercially available from RSA, The Security Division of EMC Corporation of Hopkinton, Mass. Additional details regarding possible implementations of SIEM system 110 may be found in, for example, U.S. patent application Ser. No. 12/982,288, filed Dec. 30, 2010 and entitled "Distributed Security Information and Event Management System with Application-Injected Remote Components," which is commonly assigned herewith and incorporated by reference herein.

The system 100 in the present embodiment implements one or more processes for detection of tampering with software installed on processing device 102-1. Similar functionality may be provided for one or more of the other processing devices 102 of the system 100. An example of such a process will be described in conjunction with FIG. 2, but it is to be appreciated that numerous other types of tampering detection processes may be used in other embodiments.

The processing device 102-1 as shown comprises a host-based intrusion detection system 115 configured to permit detection of tampering with at least one software component installed on the processing device 102-1. The host-based intrusion detection system 115 comprises a plurality of intrusion detection sensors 116 implemented in or otherwise associated with an executable software stack 118 of the processing device 102-1, and a forward-secure logging module 120. The forward-secure logging module 120 is configured to record information characterizing a plurality of events occurring in the device 102-1 in such a manner that modification of the recorded information characterizing the events is indicative of a tampering attack and can be detected by an authority. The intrusion detection sensors 116 may be implemented, for example, in an operating system layer or a lower layer of the executable software stack 118 of the processing device 102-1 with each such sensor configured to detect events of a particular type. By way of example, one group of events of a particular type may comprise events that are behaviorally related to compromise of a running software kernel of the processing device 102-1.

In the present embodiment, the forward-secure logging module 120 is configured to record the information characterizing the events without requiring any connection between the processing device 102-1 and the network 106 or any other network. Thus, the information is recorded regardless of whether or not the device is currently connected to a network. Also, as certain tampering attacks directed against processing device software may be carried out by an otherwise legitimate user of the processing device, the forward-secure logging module 120 in the present embodiment is configured to record the information characterizing the events even if a user or other entity carrying out the tampering attack has physical possession of the processing device.

The intrusion detection sensors 116 and forward-secure logging module 120 may be implemented at least in part in the form of software that is stored and executed by respective memory and processor elements of the processing device 102-1.

One or more of the other processing devices 102 of the system 100 may each be assumed to be configured in a manner similar to that illustrated for processing device 102-1 in the figure.

As indicated previously, the processing device 102-1 may be associated with a single user, or multiple users may be associated with a single processing device. The term "user" as utilized herein is intended to be broadly construed so as to encompass, for example, a human user associated with a given device or set of devices, an automated user such as an application or other hardware or software component associated with a given device, or any other entity that may control that device.

It is to be appreciated that the particular set of elements shown in FIG. 1 for providing detection of software tampering is presented by way of example, and in other embodiments additional or alternative elements may be used. Thus, another embodiment may include additional networks and additional sets of servers or other types and arrangements of processing devices.

As mentioned above, various elements of system 100 such as processing devices 102 and servers 105 and 112 or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices.

Figure 2:
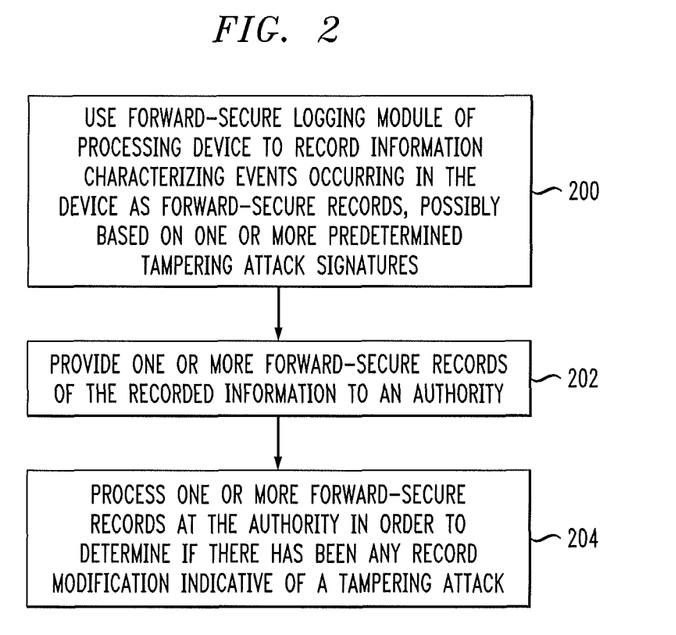
FIG. 2 is a flow diagram of a process for processing device software tampering detection implemented in the information processing system of FIG. 1.

FIG. 2 shows a set of operations performed by the system 100 in detecting a tampering attack against software installed on processing device 102-1. The process as shown includes steps 200, 202 and 204, and it is assumed that steps 200 and 202 are performed by the processing device 102-1 and step 204 is performed by one of the servers 105 or 112, although in other embodiments one or more such steps may be implemented at least in part by other system elements.

In step 200, the forward-secure logging module 120 of processing device 102-1 is used to record information characterizing events occurring in the device as forward-secure records, possibly based on one or more predetermined tampering attack signatures.

As one example, the forward-secure logging module 120 may be configured to record the information characterizing the events in the form of at least one forward-secure logging record R having entries $r_1 \ldots r_n$ corresponding to respective ones of the events. The forward-secure logging record R has the property that any erasure or other modification of a particular pre-existing entry $r_i$ in R by an attacker is detectable by the authority upon inspection of R, where i is an index that can take on integer values from 1 to n. Other types of forward-secure logging may be used in other embodiments. Additional examples of forward-secure logging can be found in the above-cited U.S. patent application Ser. No. 13/537,981.

The forward-secure logging module 120 may also be configured to record R or other information characterizing the events in a concealed manner that cannot be directly correlated with occurrence of the corresponding events. Thus, the recorded information may exhibit what is referred to herein as a stealth property, in that the behavior of the device in recording such information is not readily apparent to an attacker.

As indicated in step 200, the forward-secure logging module 120 may record at least a portion of the information characterizing the events in accordance with one or more predetermined tampering attack signatures. Each such signature may be indicative of one or more events likely to occur in conjunction with a particular type of tampering attack. Thus, for example, the host-based intrusion detection system 115 may be instrumented with signatures for a range of events of which some are likely to surface during a jailbreaking attack or other particular type of tampering attack.

By way of example, a jailbreaking attack may be configured to exploit weaknesses in a lower BSD UNIX operating system layer of a given processing device that also includes an upper iOS application layer. Such an attack may utilize a variety of different techniques, including stack-smashing or kernel code substitution. The iOS application layer typically employs sandboxing and is therefore less likely to be the target of a jailbreaking attack than the lower BSD UNIX operating system.

In step 202, one or more forward-secure records of the recorded information are provided to an authority, such as authority associated with the intrusion-alerting server 105 or one or more of the SIEM servers 112. Thus, for example, the host-based intrusion detection system 115 may be configured to periodically send to the authority over network 106 one or more forward-secure logging records generated by the forward-secure logging module 120, such as the records R described above. Such records may be communicated by the host-based intrusion detection system 115 in a concealed manner that cannot be directly correlated with occurrence of the corresponding events. For example, the records may be transmitted responsive to requests received from the authority, with the timing of the requests being controlled in a random manner by the authority. Arrangements of this type facilitate maintenance of the above-noted stealth property for the recorded information.

In step 204, one or more forward-secure records are processed at the authority in order to determine if there has been any record modification indicative of a tampering attack. By way of example, a modification indicative of a tampering attack can be detected by the authority through comparison of a given forward-secure logging record R to one or more attack-specific templates stored by the authority. As mentioned above, the authority may comprise one or more servers, such as intrusion-alerting server 105 and SIEM servers 112. A given such server can be configured to generate an alert based on detection of the tampering attack.

In addition to or in place of alert generation based on detection of record modification, alert generation can be based on a wide variety of other conditions detected in the recorded information. For example, the recorded information may comprise an indication of placement of the processing device 102-1 into a maintenance mode at a time when the processing device would not normally be placed into the maintenance mode absent a tampering attack. In some processing devices, a user typically places the device into a maintenance mode in order to perform legitimate functions, such as updating an operating system or other installed software. For example, certain devices have a maintenance mode that is more particularly referred to as a device firmware update (DFU) mode.

However, a user may also place the device into the maintenance mode when attempting to carry out a jailbreaking attack. When in maintenance mode, the device is usually off-network and operates using only a minimal set of software services which are directly exposed to attack. Nonetheless, the device is still active in maintenance mode and can therefore record information characterizing events using the forward-secure logging module 120. An alert can be generated based on such recorded information if, for example, the authority detects that the device is placed into maintenance mode at an unusual time, such as soon after the device has already been upgraded to the latest operating system.

Accordingly, the recorded information provided by the forward-secure logging module 120 of the host-based intrusion detection system 115 makes evidence of an attack available to the authority after the attack or allows the authority to determine that the evidence has been suppressed or otherwise modified. In the case of the above-noted forward-secure logging records, if a given record R is suppressed or otherwise modified, the authority can conclude that a jailbreaking attack or other type of tampering attack has taken place. Otherwise, the authority scans R looking for evidence of an attack.

The authority can also determine and store a plurality of attack-specific templates each corresponding to a particular pattern of events associated with a given attack. The authority can then look for occurrence of particular templates in the forward-secure logging records. Such templates may be derived by inspection of device forward-secure logging records in detected attacks. A given such template may be formulated as a fixed sequence of events, or as a behavioral template comprising a set of possible sequences. In the latter case, the template may not yield positive proof of a corresponding attack, but instead a risk score that can be used in conjunction with other evidence to determine the likelihood that the device has been exposed to an attack.

The particular processing operations and other system functionality described in conjunction with the flow diagram of FIG. 2 are presented by way of illustrative example only, and should not be construed as limiting the scope of the invention in any way. Alternative embodiments can use other types of processing operations for detection of tampering with processing device software. For example, the ordering of the process steps may be varied in other embodiments, or certain steps may be performed concurrently with one another rather than serially. Also, one or more of the process steps may be repeated periodically or on an as-needed basis responsive to particular events. As mentioned above, the steps of the FIG. 2 process are assumed to be implemented in a processing platform comprising at least one processing device having a processor coupled to a memory.

It is to be appreciated that tampering detection functionality such as that described in conjunction with the flow diagram of FIG. 2 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

The embodiments described in conjunction with FIGS. 1 and 2 can provide a number of significant advantages relative to conventional practice. For example, these embodiments allow reliable detection of a jailbreak even under conditions in which the device cannot communicate over a network while under attack, and after the attack contains software that suppresses evidence of jailbreaking. This improved ability to detect jailbreaking or other types of tampering with software installed on mobile phones or other processing devices can also have a deterrent effect that serves to help prevent such tampering.

Figure 3:
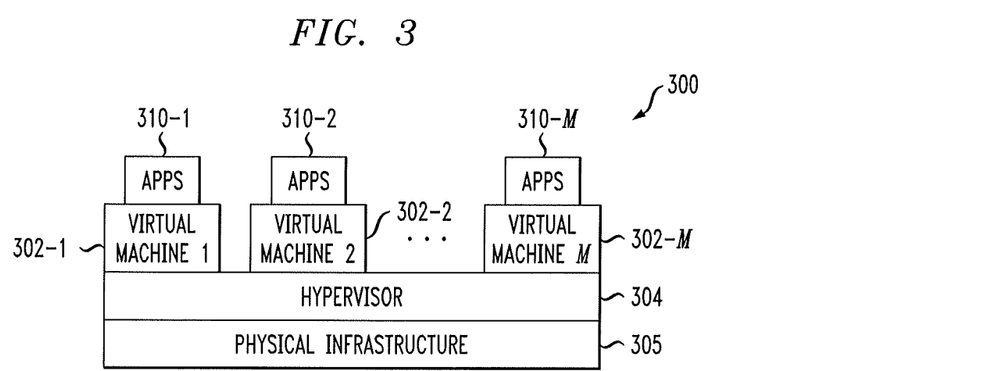
FIGS. 3 and 4 show examples of processing platforms that may be utilized to implement at least a portion of the FIG. 1 system.

Referring now to FIG. 3, portions of the information processing system 100 in this embodiment comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304. The cloud infrastructure 300 may be viewed as providing an example of what is more generally referred to herein as "virtual infrastructure." The cloud infrastructure 300 may encompass the entire system 100 or only portions of that system, such as the SOC 104 or server 105.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the cloud infrastructure of information processing system 100 in one or more embodiments of the invention is the VMware® VSphere™ which may have an associated virtual infrastructure management system such as the VMware® VCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the cloud infrastructure of system 100.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

Figure 4:
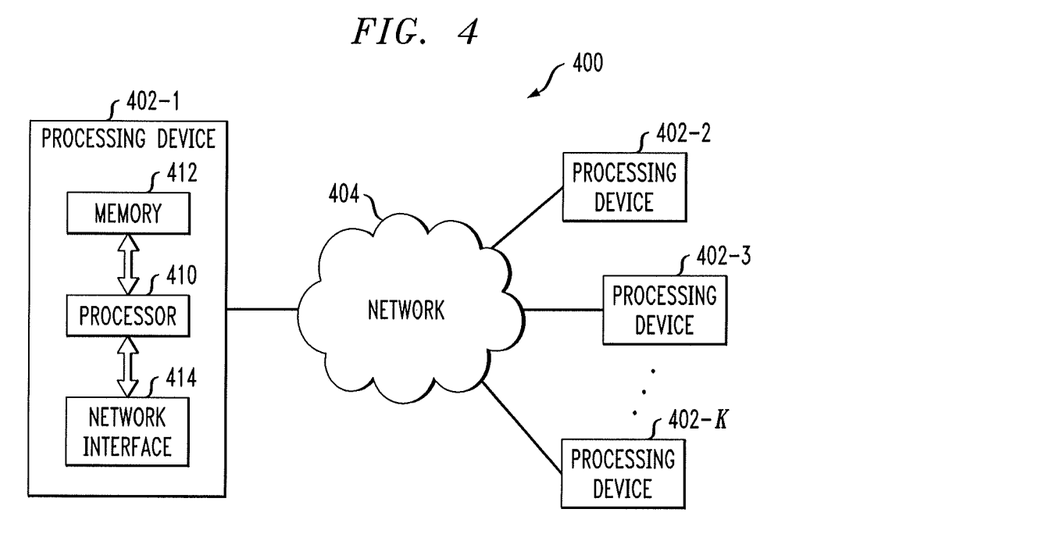

The processing platform 400 in this embodiment comprises a portion of the system 100 and includes a plurality of processing devices, denoted 402-1, 402-2, 402-3, . . . 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Multiple elements of information processing system 100 may be collectively implemented on a common processing platform of the type shown in FIG. 3 or 4, or each such element may be implemented on a separate processing platform.

Figure 5:
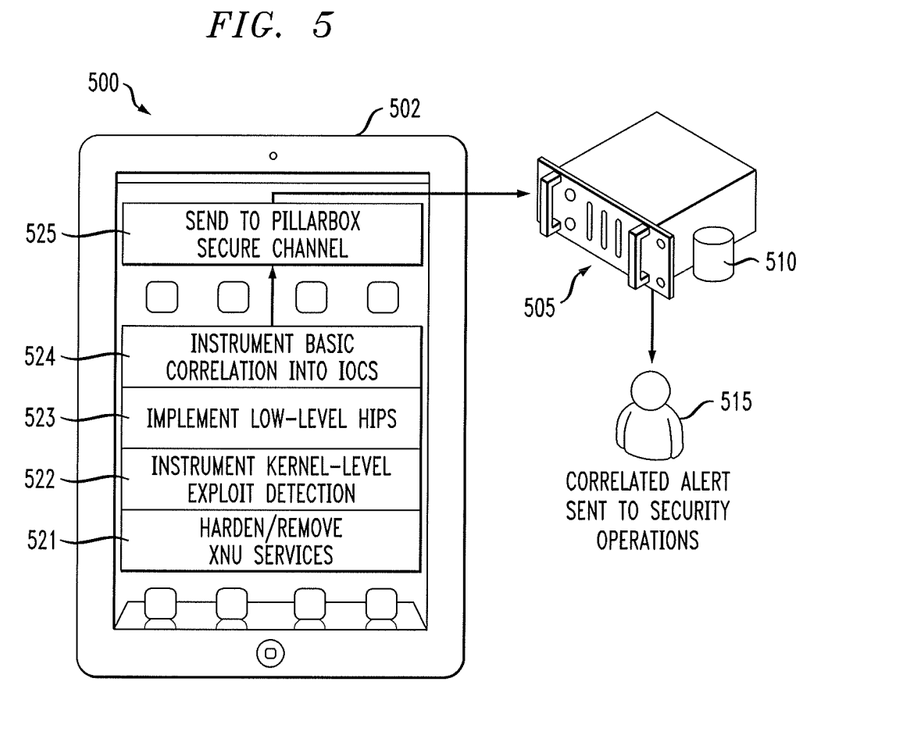
FIG. 5 is a diagram showing processing device software tampering detection functionality in another illustrative embodiment.

Another illustrative embodiment of the invention comprises information processing system 500 as illustrated in FIG. 5. In this embodiment, system 500 comprises a processing device 502 in the form of a tablet computer. The processing device 502 is configured to communicate with at least one server 505 having an associated database 510. The server 505 is associated with an authority, and may comprise, for example, an intrusion-alerting server or an SIEM server as described previously, or another type of server. The server 505 in the present embodiment generates an alert that is correlated with a sequence of events that is at least behaviorally related to compromise or other tampering attack on a running kernel or other software of the processing device 502. The alert is sent to an administrator or other personnel 515 associated with security operations in the system 500.

The processing device 502 in the present embodiment is configured to perform processing operations 521 through 525 associated with detection of a tampering attack on software installed on the device. As an initial deterrent to such attacks, X is Not UNIX (XNU) services running on the device may be hardened or removed as indicated by operation 521. Operation 522 involves instrumenting kernel-level exploit detection, possibly utilizing sensors of the type described previously herein. A low-level host-based intrusion prevention system (HIPS) is implemented in operation 523. In operation 524, basic correlations based on indicators of compromise (IoCs) are instrumented. Operation 525 sends recorded information associated with IoCs and any corresponding correlations to what is referred to herein as a PillarBox secure channel, which may illustrative comprise a forward-secure communication channel configured using one or more of the techniques disclosed in the above-cited U.S. patent application Ser. No. 13/537,981.

Using at least portions of one or more of operations 522 through 525, IoCs may be substantially continuously logged using a forward-secure logging module similar to that described in conjunction with the embodiments of FIGS. 1 and 2. The IoCs will remain intact through a DFU mode and subsequent boot and can be transmitted to the server 505 upon reconnection of the device 502 to its network. Thus, the authority can determine if the device software has been subject to a tampering attack.

The term "tampering attack" as used herein is intended to be broadly construed, so as to encompass, for example, installation of malware, viruses or other undesirable software components within a given processing device. Thus, techniques of the type described herein can be used to detect a tampering attach that involves modification of device software to include one or more such undesirable software components.

Also, the term "host-based intrusion detection system" is also intended to be broadly construed, and may encompass arrangements that also perform one or more preventative measures, such as the above-noted HIPS.

As indicated previously, functionality such as that described in conjunction with the system and process diagrams of FIGS. 1, 2 and 5 can be implemented at least in part in the form of one or more software programs stored in memory and executed by a processor of at least one processing device such as a computer or server. A memory having such program code embodied therein is an example of what is more generally referred to herein as a "computer program product."

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing platform and processing device configurations, tampering attacks, and processing device software. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing device comprising a processor coupled to a memory;
   the processing device implementing a host-based intrusion detection system configured to permit detection of tampering with at least one software component installed on the processing device;
   the host-based intrusion detection system comprising a forward-secure logging module configured to record information characterizing a plurality of events occurring in the device in such a manner that modification of the recorded information characterizing the events is indicative of a tampering attack and can be detected by an authority;
   wherein the forward-secure logging module is configured to perform said recording in a concealed manner that cannot be directly correlated with occurrence of at least one of the plurality of events; and
   wherein the host-based instruction detection system is configured to send, in response to randomly-timed requests, respective different portions of the forward-secure logging records to the authority such that the forward-secure logging records cannot be directly correlated with occurrence of the corresponding events.

2. The apparatus of claim 1 wherein the forward-secure logging module is configured to record said information without requiring any connection between the processing device and a network.

3. The apparatus of claim 1 wherein the forward-secure logging module is configured to record said information even if an entity carrying out the tampering attack has physical possession of the processing device.

4. The apparatus of claim 1 wherein the forward-secure logging module is configured to record the information characterizing the plurality of events in the form of at least one forward-secure logging record R having entries $r_1 \ldots r_n$ corresponding to respective ones of the events wherein any erasure or other modification of a particular pre-existing entry $r_i$ in R by an attacker is detectable by the authority upon inspection of R, where i is an index that can take on integer values from 1 to n.

5. The apparatus of claim 1 wherein:
the forward-secure logging module is instrumented with one or more predetermined signatures each indicative of one or more events likely to occur in conjunction with a particular type of tampering attack; and
the forward-secure logging module is configured, responsive to detecting one or more events likely to occur in conjunction with a given one of the particular types of tampering attack, to record the one or more events as a given one of the predetermined signatures indicative of the given particular type of tampering attack.

6. The apparatus of claim 1 wherein the host-based intrusion detection system is configured to communicate the respective different portions of the forward-secure logging records to the authority over a network.

7. The apparatus of claim 4 wherein said modification indicative of a tampering attack can be detected by an authority through comparison of the forward-secure logging record R to one or more attack-specific templates stored by the authority.

8. The apparatus of claim 1 wherein the host-based intrusion detection system comprises a plurality of intrusion detection sensors implemented in an operating system layer or a lower layer of an executable software stack of the processing device with each such sensor configured to detect events of a particular type.

9. The apparatus of claim 1 wherein the events are behaviorally related to compromise of a running software kernel of the processing device.

10. The apparatus of claim 1 wherein the processing device is configured to communicate with a server of said authority and wherein said server generates an alert based on detection of the tampering attack.

11. The apparatus of claim 1 wherein the recorded information comprises an indication of placement of the processing device into a maintenance mode at a time when the processing device would not normally be placed into the maintenance mode absent a tampering attack.

12. A method comprising the steps of:
recording information characterizing a plurality of events occurring in a processing device using a forward-secure logging module of the processing device; and
providing the recorded information to an authority;
wherein the recording step comprises recording the information characterizing the events in such a manner that modification of the recorded information is indicative of a tampering attack and can be detected by the authority;
wherein the recording step comprises using the forward-secure logging module to perform said recording in a concealed manner that cannot be directly correlated with occurrence of at least one of the plurality of events; and
wherein the providing step comprises sending, in response to randomly-timed requests, respective different portions of the recorded information to the authority such that the recorded information cannot be directly correlated with occurrence of the corresponding events.

13. The method of claim 12 wherein the recording step comprises recording the information characterizing the plurality of events in the form of at least one forward-secure logging record R having entries $r_1 \ldots r_n$ corresponding to respective ones of the events wherein any erasure or other modification of a particular pre-existing entry $r_i$ in R by an attacker is detectable by the authority upon inspection of R, where i is an index that can take on integer values from 1 to n.

14. The method of claim 12 wherein:
the forward-secure logging module is instrumented with one or more predetermined signatures each indicative of one or more events likely to occur in conjunction with a particular type of tampering attack; and
the recording step comprises, responsive to detecting the one or more events likely to occur in conjunction with a given one of the particular types of tampering attack, recording the one or more events as a given one of the predetermined signatures indicative of the given particular type of tampering attack.

15. A computer program product comprising a non-transitory processor-readable storage medium having encoded therein executable code of one or more software programs, wherein the one or more software programs when executed by said processing device cause the steps of the method of claim 12 to be performed.

16. An information processing system comprising:
at least one processing device; and
an authority adapted for communication with the processing device;
the processing device implementing a host-based intrusion detection system configured to permit detection of tampering with at least one software component installed on the processing device;
the host-based intrusion detection system comprising a forward-secure logging module configured to record information characterizing a plurality of events occurring in the device in such a manner that modification of the recorded information characterizing the events is indicative of a tampering attack and can be detected by the authority;
wherein the forward-secure logging module is configured to perform said recording in a concealed manner that cannot be directly correlated with occurrence of at least one of the plurality of events; and
wherein the host-based instruction detection system is configured to send, in response to randomly-timed requests, respective different portions of the forward-secure logging records to the authority such that the forward-secure logging records cannot be directly correlated with occurrence of the corresponding events.

17. The information processing system of claim 16 wherein the authority comprises at least one server.

18. The apparatus of claim 11 wherein the maintenance mode comprises a device firmware updated (DFU) mode.

* * * * *